(12) United States Patent
Chuang

(10) Patent No.: US 8,421,769 B2
(45) Date of Patent: Apr. 16, 2013

(54) ELECTRONIC COSMETIC CASE WITH 3D FUNCTION

(75) Inventor: Ping-Yang Chuang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 113 days.

(21) Appl. No.: 12/975,255

(22) Filed: Dec. 21, 2010

(65) Prior Publication Data

US 2012/0105336 A1    May 3, 2012

(30) Foreign Application Priority Data

Oct. 27, 2010    (TW) ............................... 99136648 A

(51) Int. Cl.
    *G06F 3/041*    (2006.01)
(52) U.S. Cl.
    USPC ........................................................ 345/173
(58) Field of Classification Search .................. 345/156, 345/173
    See application file for complete search history.

(56) References Cited

U.S. PATENT DOCUMENTS

| | | | |
|---|---|---|---|
| 2001/0037191 A1* | 11/2001 | Furuta et al. | 703/6 |
| 2002/0009214 A1* | 1/2002 | Arima et al. | 382/128 |
| 2003/0041871 A1* | 3/2003 | Endo et al. | 132/301 |
| 2003/0065255 A1* | 4/2003 | Giacchetti et al. | 600/407 |
| 2003/0203747 A1* | 10/2003 | Nagamine | 455/575.3 |
| 2004/0110113 A1* | 6/2004 | Huang et al. | 434/100 |
| 2005/0135675 A1* | 6/2005 | Chen et al. | 382/162 |
| 2007/0188477 A1* | 8/2007 | Rehm | 345/179 |
| 2009/0231356 A1* | 9/2009 | Barnes et al. | 345/594 |

FOREIGN PATENT DOCUMENTS

| | | | |
|---|---|---|---|
| JP | 2002125225 | * | 4/2002 |
| JP | 2003289938 | * | 10/2003 |
| JP | 2005-181688 A | | 7/2005 |
| JP | 2010017360 | * | 1/2010 |
| TW | 200521851 A | | 7/2005 |
| WO | WO2006097638 | * | 9/2006 |
| WO | WO2009011402 | * | 1/2009 |

* cited by examiner

*Primary Examiner* — Chanh Nguyen
*Assistant Examiner* — Robert Stone
(74) *Attorney, Agent, or Firm* — Altis Law Group, Inc.

(57) ABSTRACT

An electronic cosmetic case includes a stereo image display unit, and a pair of image capturing units. The pair of image capturing units is for simultaneously capturing facial image of a user from two different directions, and providing the captured images to the stereo image display unit. The stereo image display unit receives the two captured images and simultaneously displays one captured image to the left eye and displays the other captured image to the right eye, thus allowing the user to perceive a stereo image.

1 Claim, 3 Drawing Sheets

ELECTRONIC COSMETIC CASE WITH 3D FUNCTION

BACKGROUND

1. Technical Field

The present disclosure relates to cosmetic cases and, particularly, to an electronic cosmetic case which can generate 3D images.

2. Description of Related Art

Cosmetic cases usually include a base and a plane mirror rotatably connected to the base. The base defines a receiving space for placing a number of cosmetics for the user to select to put on for makeup. When doing that, the user usually looks at the plane mirror to determine whether the makeup is being done correctly. However, the plane mirror has many blind spots, which are not easy for the user to see, making it difficult to determine how the makeup has been done. Furthermore, this difficulty often leads to unsatisfactory makeup and the user has to remove and redo the makeup. This can be very time-consuming and frustrating.

DETAILED DESCRIPTION

Figure 1:
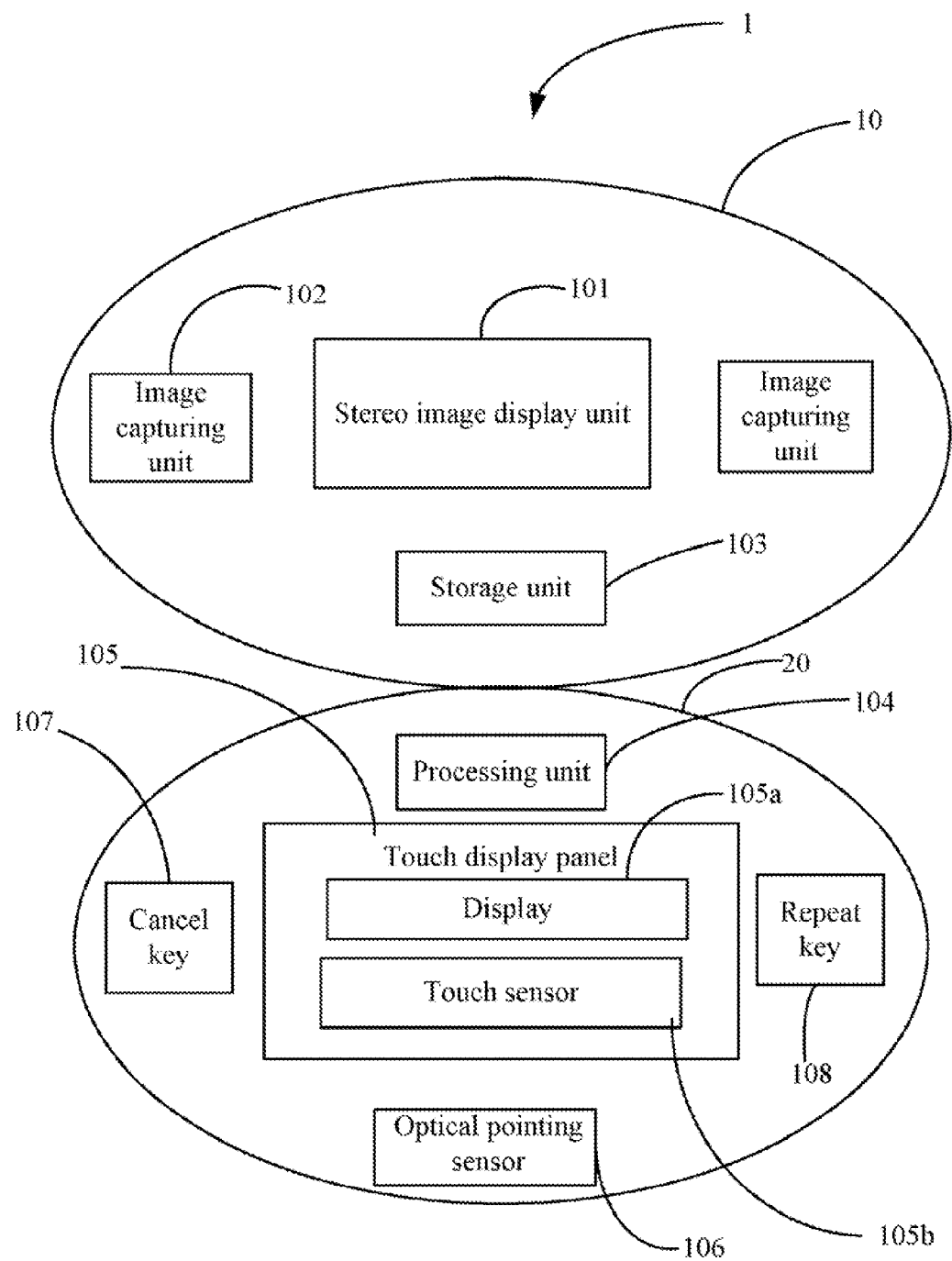
FIG. 1 is a schematic diagram of an electronic cosmetic case in accordance with an exemplary embodiment.

Referring to FIG. 1, an electronic cosmetic case 1 is provided. The electronic cosmetic case 1 includes a stereo image display unit 101, a pair of image capturing units 102, a touch display panel 105, and an optical pointing sensor 106 that can be detached and held by the user, a processing unit 104, and a storage unit 103. In one embodiment, the electronic cosmetic case 1 is formed by engaging a cover 10 with a base 20. The cover 10 and the base 20 are elliptical. The stereo image display unit 101 is mounted on an inner surface of the cover 10. The pair of image capturing units 102 is placed on two opposite sides of the stereo image display unit 101. The touch display panel 105 and the optical pointing sensor 106 are mounted on the base 20. The processing unit 104 and the storage unit 105 can be set in the cover 10 or in the base 20 if necessary.

The pair of image capturing units 102 are for simultaneously capturing a facial image of a user from two different directions thereby obtaining two captured images, and providing the two captured images to the stereo image display unit 101.

The stereo image display unit 101 displays one captured image to the right eye, and the other captured image to the left eye of the user, allowing the user to perceive a stereo image. In one embodiment, the stereo image display unit 101 may be a parallax barrier display, or a lenticular lens display.

The touch display panel 105 includes a display 105a and a touch sensor 105b. The display 105a displays a number of virtual cosmetics, such as rouge, shading powder, pressed powder, for the user to select. In one embodiment, the electronic cosmetic case 1 further includes an interface (not labeled) which is used for connecting to the network (not shown), and the electronic cosmetic case 1 downloads the virtual cosmetics which are popular from the network through the interface. The touch sensor 105b is attached to the lower surface of the display 105a, and is used for sensing a touch on the display 105a to generate a selecting signal associated with the touch.

Figure 2:
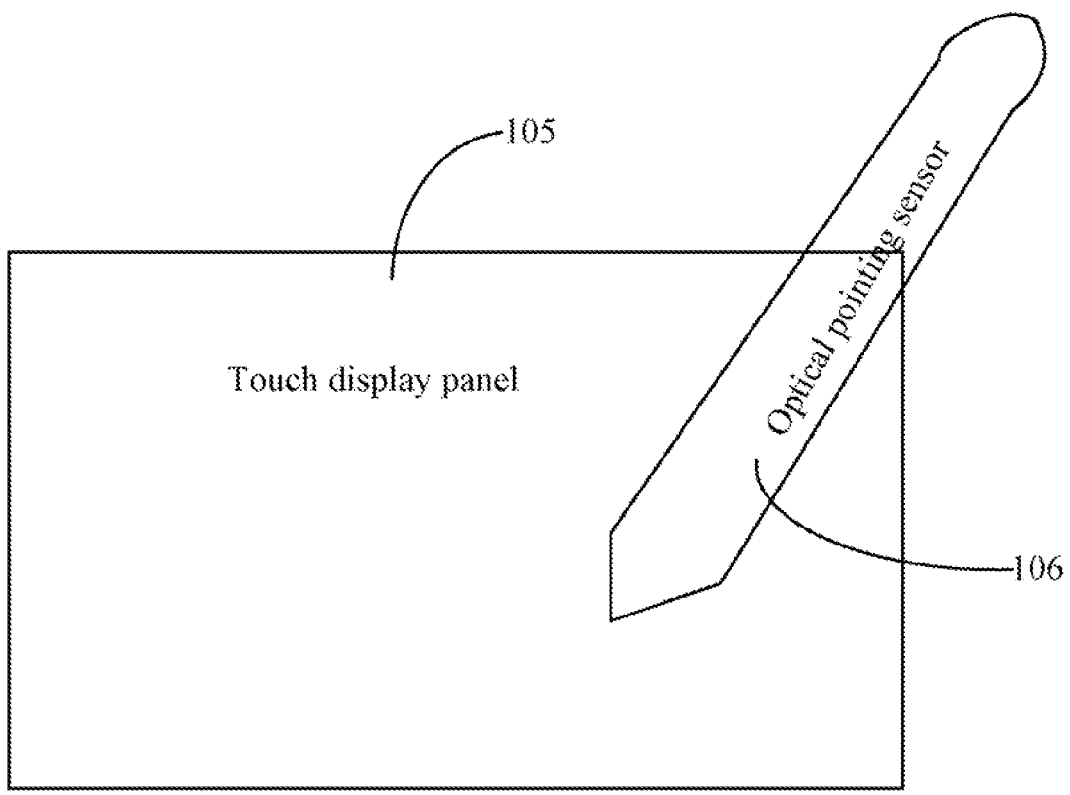
FIG. 2 shows a touch display panel of the electronic cosmetic case of FIG. 1 being touched by an optical pointing sensor of the electronic cosmetic case of FIG. 1.

As shown in FIG. 2, the optical pointing sensor 106 is used for touching the display 105a to select a corresponding virtual cosmetic from the number of virtual cosmetics. The optical pointing sensor 106 is further used for touching the face of the user, and making movements on the face, thereby simulating the application of makeup on the face of the user. During the movement of the optical pointing sensor 106 on the face, the optical pointing sensor 106 is generating a pressure signal according strength of the simulated makeup on the face.

Figure 3:
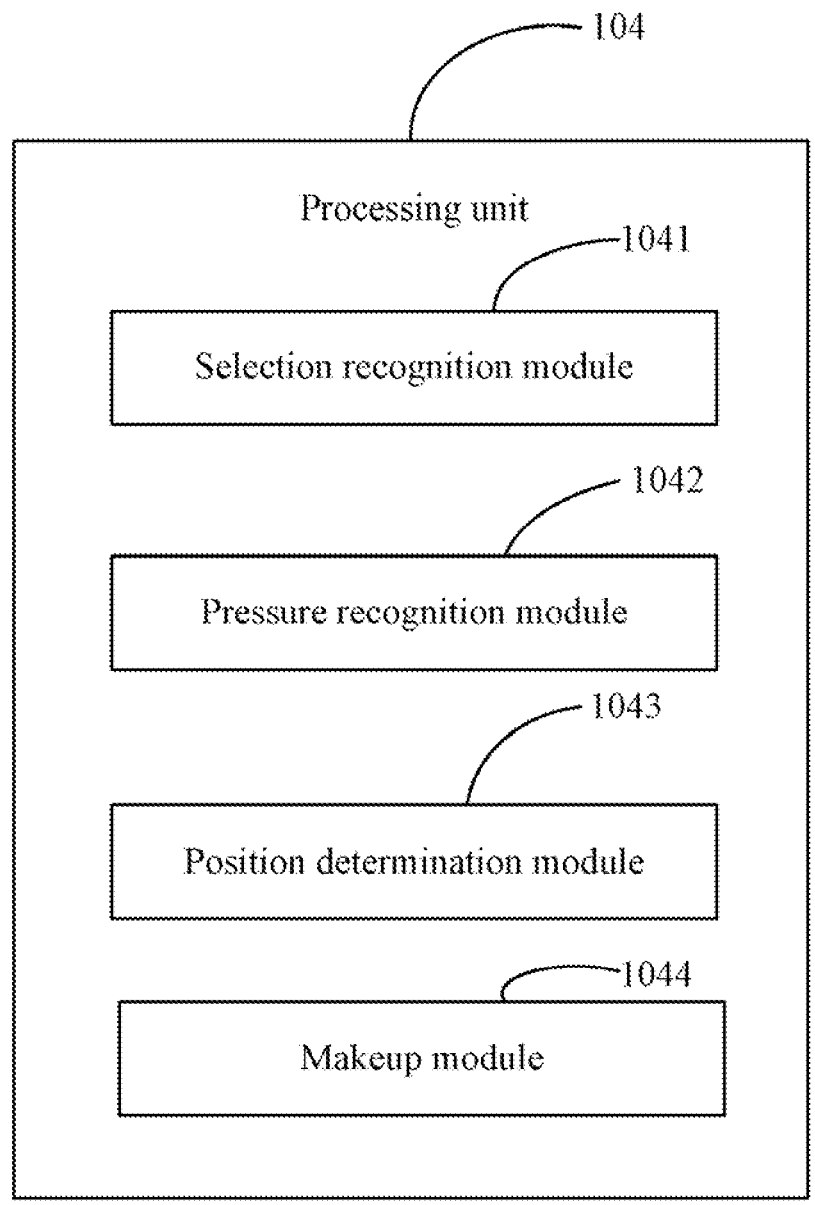
FIG. 3 is a block diagram of a hardware infrastructure of a processing unit of the electronic cosmetic case of FIG. 1, in accordance with an exemplary embodiment.

As shown in FIG. 3, the processing unit 105 includes a selection recognition module 1041, a pressure recognition module 1042, a position determination module 1043, and a makeup module 1044. The selection recognition module 1041 is used for recognizing the selecting signal from the touch sensor 105b to determine a selected virtual cosmetic.

The pressure recognition module 1042 is used for recognizing the pressure signal from the optical pointing sensor 106 to determine a strength of the simulative makeup, and determining a thickness of the selected virtual cosmetic according the strength of the makeup.

The position determination module 1043 is used for acquiring a movement track of the optical pointing sensor 106 on the face of the user when recognizing the pressure signal.

The makeup module 1044 is used for doing a simulation of makeup on the stereo image displayed on the stereo image display unit 101 according to the determined movement track, and filling in the selected virtual cosmetic on the movement track of the stereo image according the thickness of the selected virtual cosmetic to created a simulated stereo makeup image.

The storage unit 103 stores the simulated stereo makeup image according the user operation.

In other embodiments, the electronic cosmetic case 1 further includes a number of keys, such as, a cancel key 107, and a repeat key 108. The cancel key 107 is used for cleaning the virtual cosmetic shown on the stereo image according to the user operation. The repeat key 108 is used for repeating the steps of doing the simulation of makeup on the stereo image according to the user operation. For example, when the user applies the virtual cosmetic on the left side of the face of the stereo image and is satisfied, then the user can press the repeat key 108 to repeat the same step on the right side of the face of the stereo image, thereby saving time.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic cosmetic case comprising:
   a pair of image capturing units for simultaneously capturing facial images of a user from two different directions thereby obtaining two captured images;
   a stereo image display unit to receive the two captured images and simultaneously display one captured image to the left eye and the other captured image to the right eye, thus allowing the user to perceive a stereo image;
   a touch display panel for displaying a plurality of virtual cosmetics for the user to select;
   an optical pointing sensor for touching the touch display panel to select one virtual cosmetic from the plurality of virtual cosmetics, and touching a face of the user to make movements on the face according to the user operation, thereby simulating the application of makeup on the face of the user;
   a processing unit for determining a selected virtual cosmetic when the optical pointing sensor touches the plurality of virtual cosmetics, determining a movement track of the optical pointing sensor on the face and a thickness of the selected virtual cosmetic when the optical pointing sensor does the simulative makeup on the face of the user, doing the simulative makeup along the determined movement track on the stereo image, and creating a simulated stereo makeup image by filling the selected virtual cosmetic on the stereo image according to the determined thickness of the virtual cosmetic; and a repeat key for repeating a step of doing a simulation of makeup on the stereo image according to the user operation.

\* \* \* \* \*